March 4, 1958  S. DAVIS  2,825,830

ELECTROMECHANICAL DEVICE

Filed May 8, 1953

INVENTOR.
SIDNEY DAVIS
BY
Raymond A. Paquin
ATTORNEY.

United States Patent Office 2,825,830
Patented Mar. 4, 1958

2,825,830

ELECTROMECHANICAL DEVICE

Sidney Davis, Brooklyn, N. Y., assignor to American Bosch Arma Corporation

Application May 8, 1953, Serial No. 353,773

8 Claims. (Cl. 310—159)

The present invention relates to electromechanical devices and has particular reference to units which are used as signal generators and torque generators.

The present invention comprises a salient pole rotor mounted for rotation in a non-salient pole stator having the same number of poles. The stator contains two full pitch concentrated windings which are separated by ninety electrical degrees. The rotor is preferably a dumbbell shaped piece, symmetrical about all axes and without windings thereon. In this construction the reluctance of the device is a constant value and, for convenience, the device will be referred to as a reluctance unit.

The reluctance unit may be adapted to perform a number of varied functions merely by changing the connections thereto. As a signal generator or pickoff device, one stator winding is energized, and the voltage induced in the other is a measure of the rotor displacement. The signal generator operates over a wider range of rotor displacement than in prior instruments of this type, and requires a considerably lower torque to drive the rotor since there are no brushes adding to the bearing friction.

As a torque generator both stator windings are energized separately, and the rotor is at or near the zero position. The torque is constant over a wide range of rotor position and is proportional to the product of the currents energizing the stator windings.

As an elastic restraint generator, both stator windings are energized with the same current and the rotor is positioned midway between the windings. At that position the torque on the rotor is zero but for displacements from that position a restoring torque, proportional to the angle of displacement, is applied to the rotor.

For a more complete understanding of the invention, reference may be had to the accompanying diagrams in which.

Figure 1:
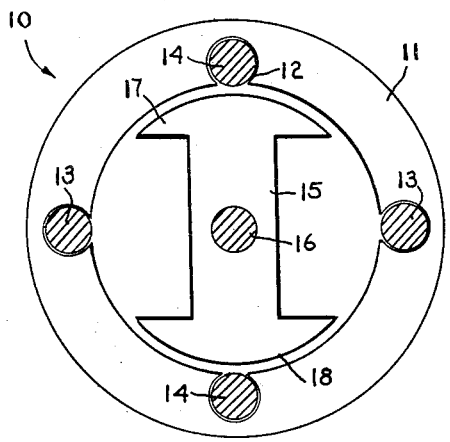
Figure 1 is a sectional view of the reluctance unit.

With reference now to Figure 1 the reluctance unit 10 is shown in section in its most simple basic form. The unit 10 comprises annular stator core 11 with slots 12 which receive the stator windings 13 and 14, a rotor core 15 supported by shaft 16 which is rotatable within the stator core 11. Windings 13 and 14 are each concentrated full pitch windings and are displaced by ninety degrees relatively to each other, but do not necessarily contain the same number of turns. Rotor 15 is a dumbbell shaped laminated core, symmetrical about all its axes and centrally located within the core 11. This unit as described above is the fundamental unit which may be refined for accuracy. Refinements may include any or all of the following devices: dummy stator slots, shaping of the pole faces 17 and 18 of rotor 15, utilization of compensating windings on rotor 15 and in the dummy slots of stator 11 and proper skewing of the stator slots.

Figure 2:
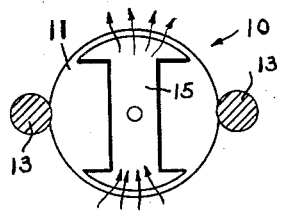
Figure 2 is a diagram showing the effect of the rotor in one position.
Figure 3:
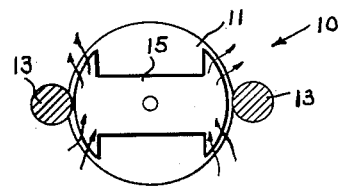
Figure 3 is a diagram showing the effect of the rotor in a position 90° away from the position in Figure 2.

The reluctance of the magnetic circuit is substantially constant and independent of the rotation of the rotor 14. This property of the unit 10 is most easily demonstrated by reference to Figures 2 and 3. It is well known that the reluctance is a function of the total area of the rotor linking the space flux with the stator core 11, and is also dependent on the air gap between the rotor pole faces and the stator. If winding 13 is energized to produce a magnetic field in the rotor 15 the area of pole face for the entering and leaving flux is the same whether the rotor 15 is aligned with the magnetic axis of winding 13 as in Figure 2, or whether the rotor 15 is perpendicular to the magnetic axis of winding 13 as in Figure 3, or for any position in between. Interpole space flux and saturation of the core materials will affect the constancy but these effects can be minimized by proper design, and the slight variation produced thereby will be neglected in this description. Therefore, since the reluctance is substantially constant it will be seen that the self inductance of winding 13 is constant and independent of rotor 15 position. Also, it follows by similar reasoning, that the self inductance of winding 14 is substantially constant and independent of the position of rotor 15.

Figure 4:
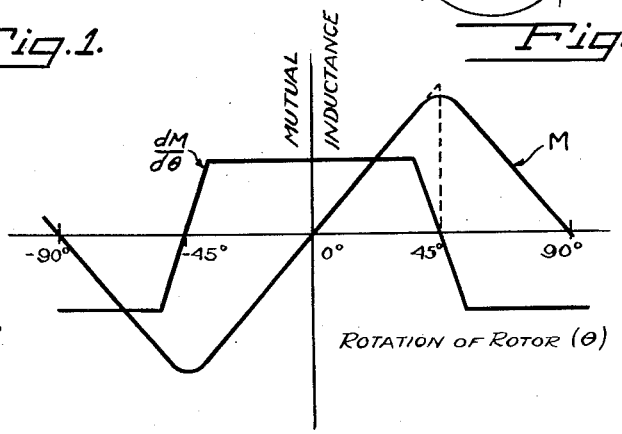
Figure 4 is a curve showing the relationship between mutual inductance and rotor displacement.

The mutual inductance of coils 13 and 14 however is a function of rotor displacement and varies essentially as shown in Figure 4. Again neglecting the effects of interpole space flux and core saturation, the mutual inductance M changes linearly for nearly 90° of the rotation of rotor 15 from a position of −45° to +45° with respect to either winding 13 or 14. In the regions near ±45° the mutual inductance is affected materially by the skewing of the stator slots 12, and possibly dummy slots, not shown. The skewed slots cause the relationship between the mutual inductance and the rotation of the rotor 15 to be parabolic for a small angle to either side of the ±45° position, the range being approximately half the angle of skew. Therefore, in the region that M is linear, $$\frac{dM}{d\theta}$$

the rate of change of M with rotation is constant, and in the region near ±45°

$$\frac{dM}{d\theta}$$

is a function of $\theta$, $F(\theta)$. Although the derivation will not be shown, the theoretical value of $F(\theta)$ is found to be $$\frac{4M \max}{\pi \lambda}\left(\theta - \frac{\pi}{4}\right)$$

where M max is the mutual inductance at 45° found by extension of the linear relationship and $\lambda$ is the angle of skew.

The reluctance unit of Figure 1 can be used for a number of purposes by appropriately energizing the stator windings 13 and 14.

Figures 5, 6, 7:
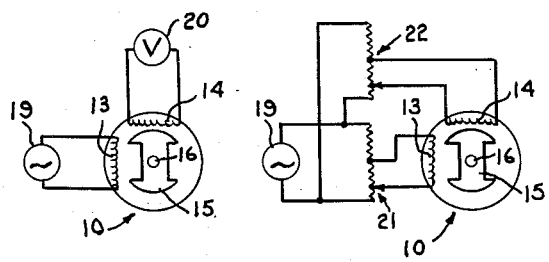
Figure 5 is a diagram showing the reluctance unit connected as a signal generator.
Figure 6 is a diagram showing the reluctance unit connected as a torque generator.
Figure 7 is a diagram showing the reluctance unit connected as an elastic restraint generator.

Thus, in Figure 5, the reluctance unit is connected as a signal generator, or pickoff device. If coil 13 is energized by a constant alternating voltage E from a power supply 19 and a voltmeter 20 is connected across winding 14, the voltage V at voltmeter 20 is expressed by the following equation:

$$V = E \frac{jwM}{jwL_{13} + R_{13}} \times \frac{Z_0}{Z_L + Z_0} \quad (1)$$

where $Z_0$ = the source impedance at output winding 14
$Z_L$ = load impedance
$R_{13}$ = resistance of winding 13
$L_{13}$ = inductance of winding 13
$M$ = mutual inductance between windings 13 and 14
$W = 2\pi$ times the frequency of E It will be seen that since E, $Z_0$, $Z_1$, $R_{13}$, and $WL_{13}$ are all constant, $$V = kjWM \qquad (2)$$

Since M varies with $\theta$ for a considerable range about $\theta = 0$ $$V = k\theta \qquad (3)$$

Therefore, the output of winding 14 varies according to the displacement of rotor 15, so that the magnitude of the voltage at voltmeter 20 is proportional to the displacement of rotor 15 while the phase of the voltage corresponds to the direction of displacement of rotor 15.

Figure 6 shows the reluctance unit connected as a torque generator which produces a torque on shaft 16 upon energization of the windings 13 and 14. In this instance the windings 13 and 14 are both energized from power supply 19 through voltage varying devices 21 and 22 which may be resistance potentiometers as shown in Figure 6 or any other suitable device. The torque T on the rotor 15 is then given by the expression $$T \cong \tfrac{1}{2} i_{13}^2 \frac{dL_{13}}{d\theta} + \tfrac{1}{2} i_{14}^2 \frac{dL_{14}}{d\theta} + i_{13} i_{14} \frac{dM}{d\theta} \qquad (4)$$

where $i_{13}$, $i_{14}$ are the currents in windings 13 and 14 respectively, and $L_{13}$, $L_{14}$ are the inductance values of windings 13 and 14 respectively.

Since $L_{13}$ and $L_{14}$ are independent of rotor position, $$\frac{dL_{13}}{d\theta} \text{ and } \frac{dL_{14}}{d\theta}$$

are zero. Therefore, $$T = i_{13} i_{14} \frac{dM}{d\theta} \qquad (5)$$

But $$\frac{dM}{d\theta}$$

is constant (for a considerable range), and $$T = k i_{13} i_{14} \qquad (6)$$

Equation 6 shows that a torque may be applied to shaft 16 when the rotor 15 is at or near zero displacement and that this torque, proportional to the product of $i_{13}$ and $i_{14}$, may be controlled by controlling either of the currents $i_{13}$ or $i_{14}$.

Figure 7 shows the use of the reluctance unit as an elastic restraint generator. In this application the reluctance unit applies a restoring torque to shaft 16 upon displacement of the rotor 15 from the 45° position. Windings 13 and 14 are connected in series and supplied with a current $i$ from the power supply 19. The torque applied thereby to the rotor 15 is given by Equation 4 which, for equal currents in the windings 13 and 14, reduces to $$T = i^2 \frac{dM}{d\theta} \qquad (7)$$

since $$\frac{dL_{13}}{d\theta} \text{ and } \frac{dL_{14}}{d\theta}$$

are small with respect to $$\frac{dM}{d\theta}$$

and may be considered equal to zero.

In accordance with Equation 7, there will be no torque on rotor 14 when $$\frac{dM}{d\theta}$$

is equal to zero, i. e. when $\theta = 45°$. To either side of 45°

$$\frac{dM}{d\theta}$$

varies according to the function $F(\theta)$ as described earlier. Thus the torque on shaft 16 upon displacement from the 45° position is $$T = i^2 F(\theta) \qquad (8)$$

Since $i$ is constant Equation 8 may be written simply as $$T = -F_2(\theta) \qquad (9)$$

The negative sign in Equation 9 denotes that the torque on the rotor 15 is such as to restore the rotor to the 45° position upon displacement therefrom. It will be seen then that the reluctance unit acts like a spring which acts to resist displacement of the shaft 16.

Although the reluctance unit built as shown in Figure 1 will perform satisfactorily as described, the accuracy for each function can be improved by using special design features and compensations for that particular function. The invention here described is not intended to be limited by the construction shown and described, but may contain any of the appropriate compensating devices mentioned previously. In addition, although only a two pole device has been shown, certain advantages may occur from use of multipolar units built according to the principles herein disclosed.

I claim:

1. In a device of the character described, a non-salient pole stator, a salient pole rotor mounted for rotation therein, said stator and rotor each having a similar number of poles, said stator having two full pitch concentrated windings with said windings being separated by ninety electrical degrees.

2. In a device of the character described, a non-salient pole stator, a salient pole rotor mounted for rotation therein, said stator and rotor each having a similar number of poles, said stator having two full pitch concentrated windings with said windings being separated by ninety electrical degrees, said rotor being a dumbbell shaped member symmetrical about all axes and without windings thereon.

3. In a device of the character described, a non-salient pole stator, a salient pole rotor mounted for rotation therein, said stator and rotor each having a similar number of poles, said stator having two full pitch concentrated windings with said windings being separated by ninety electrical degrees, one of said stator windings being energized and the voltage induced in the other of said stator windings being a measure of the displacement of said rotor.

4. In a device of the character described, a non-salient pole stator, a salient pole rotor mounted for rotation therein, said stator and rotor each having a similar number of poles, said stator having two full pitch concentrated windings with said windings being separated by ninety electrical degrees, said rotor being a dumbbell shaped member symmetrical about all axes and without windings thereon, one of said stator windings being energized and the voltage induced in the other of said stator windings being a measure of the displacement of said rotor.

5. In a device of the character described, a non-salient pole stator, a salient pole rotor mounted for rotation therein, said stator and rotor each having a similar number of poles, said stator having two full pitch concentrated windings with said windings being separated by ninety electrical degrees, said stator windings being energized separately.

6. In a device of the character described, a non-salient pole stator, a salient pole rotor mounted for rotation therein, said stator and rotor each having a similar number of poles, said stator having two full pitch concentrated windings with said windings being separated by ninety electrical degrees, said rotor being a dumbbell shaped member symmetrical about all axes and without windings thereon, said stator windings being energized separately.

7. In a device of the character described, a non-salient pole stator, a salient pole rotor mounted for rotation therein, said stator and rotor each having a similar number of poles, said stator having two full pitch concentrated windings with said windings being separated by ninety electrical degrees, both of said stator windings being energized with the same current and said rotor being positioned midway between said windings.

8. In a device of the character described, a non-salient pole stator, a salient pole rotor mounted for rotation therein, said stator and rotor each having a similar number of poles, said stator having two full pitch concentrated windings with said windings being separated by ninety electrical degrees, said rotor being a dumbbell shaped member symmetrical about all axes and without windings thereon, both of said stator windings being energized with the same current and said rotor being positioned midway between said windings.

References Cited in the file of this patent

UNITED STATES PATENTS

| 1,653,946 | Clausen | Dec. 27, 1927 |
| 2,488,734 | Mueller | Nov. 22, 1949 |
| 2,488,771 | Glass | Nov. 22, 1949 |
| 2,596,711 | Mueller | May 13, 1952 |
| 2,611,799 | Ackerman | Sept. 23, 1952 |

FOREIGN PATENTS

| 644,773 | Great Britain | Oct. 18, 1950 |